Sept. 23, 1958     L. V. SCHMIDT ET AL     2,853,256
INTERNAL RESISTANCE PLATE FOR AIRCRAFT CONTROL SURFACES
Filed Aug. 23, 1954                                2 Sheets—Sheet 1
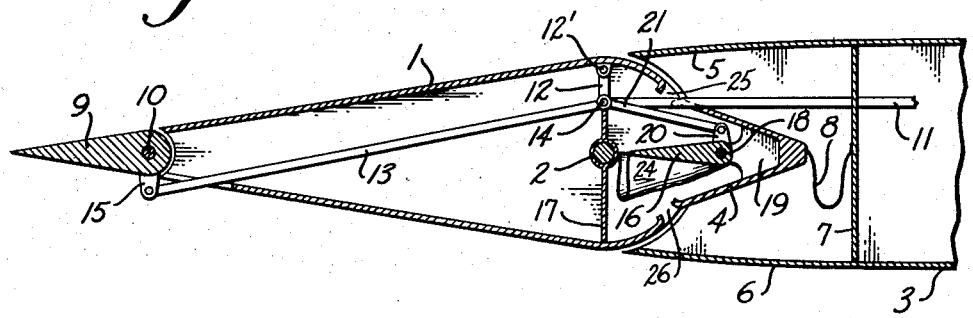
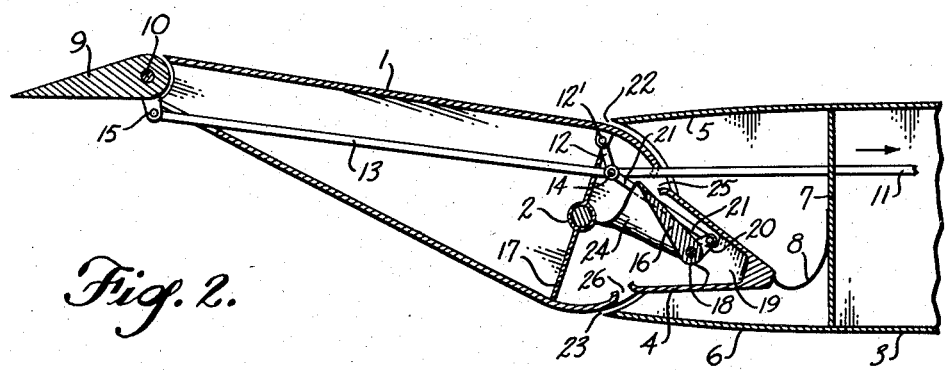
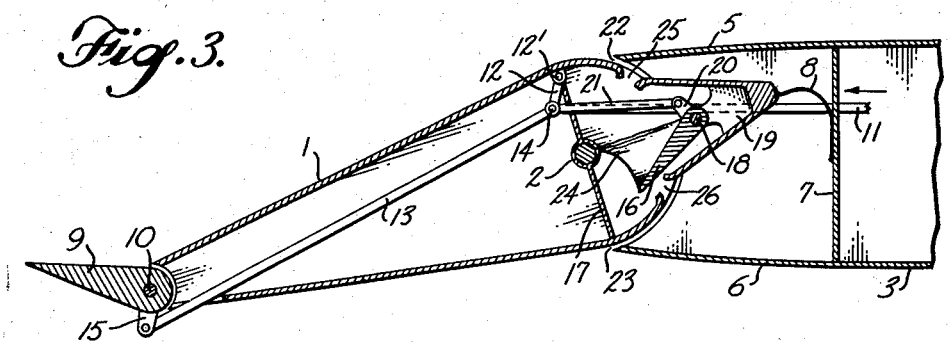
INVENTORS.
LOUIS V. SCHMIDT
ROLAND J. WHITE
BY
Reynolds, Beach & Christensen
ATTORNEYS

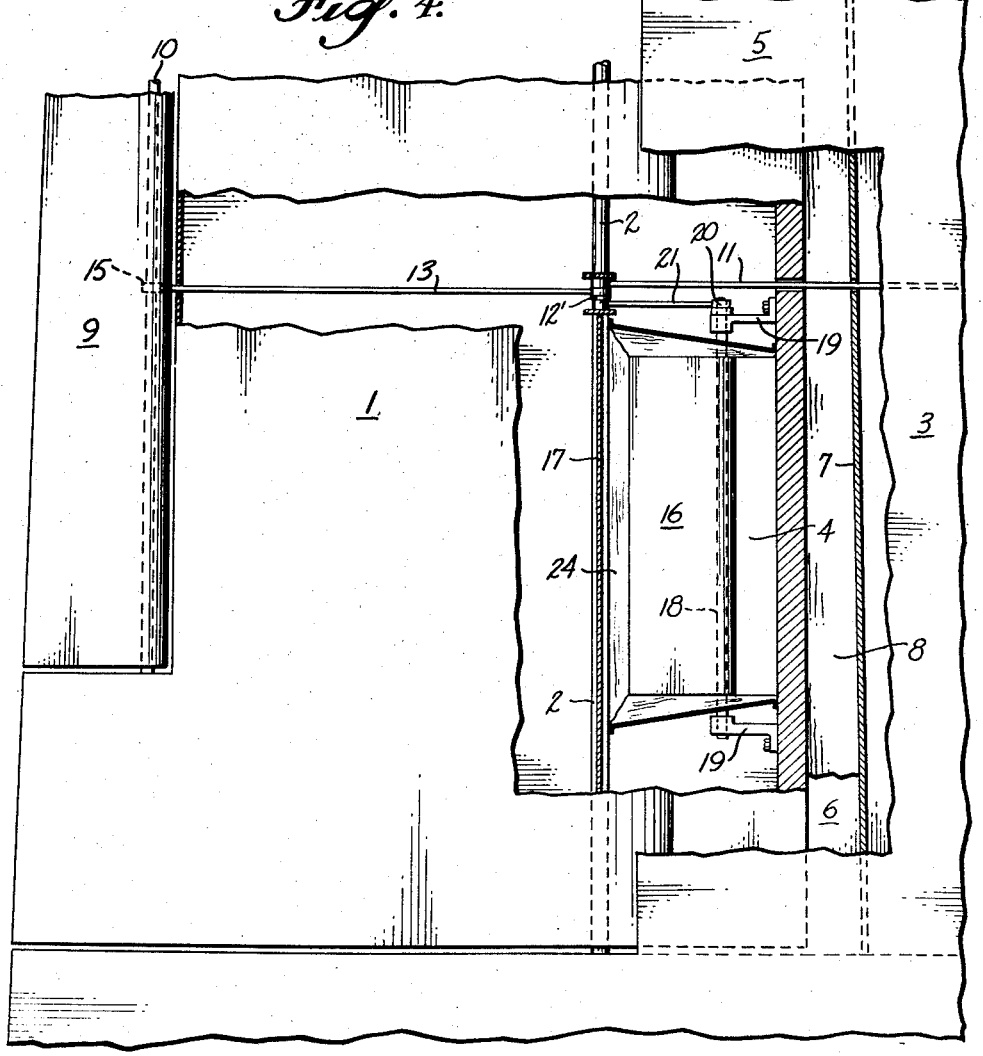

United States Patent Office 2,853,256
Patented Sept. 23, 1958

2,853,256

INTERNAL RESISTANCE PLATE FOR AIRCRAFT CONTROL SURFACES

Louis V. Schmidt and Roland J. White, Seattle, Wash., assignors to Boeing Airplane Company, Seattle, Wash., a corporation of Delaware Application August 23, 1954, Serial No. 451,602

10 Claims. (Cl. 244—90)

The internal resistance plate of the present invention is used in conjunction with an aircraft control surface boost or power operating mechanism and is particularly well adapted for an installation where the control surface movement is effected by a control tab.

The control surfaces of large airplanes, unless they have exceptionally large balance vanes, require more force to move them than can be exerted readily by the pilot. If the balance vane of such a control surface is made large enough to reduce the control forces sufficiently, particularly for high airplane speeds, such balance vane at large angles of control deflection will extend beyond a lateral surface of the stationary airfoil ahead of it, particularly in the case of high speed airplanes, in which case such surfaces are comparatively thin. For that reason it is customary to provide some movement assisting mechanism which, for example, either may be a power control connected to swing the control surface, or a control tab which will effect or aid swinging of the control surface.

While the reasons stated it is necessary to provide mechanism for assisting the pilot to move the control surfaces of a large airplane, it is undesirable for the pilot to be able to move the control surfaces to any degree without resistance. With such a control system the pilot may be inclined to move a control surface too much without realizing it, which results in producing an excessive control of the airplane and subjecting the airplane control surfaces to unnecessarily great aerodynamic forces. Moreover, it is desirable to provide control mechanism which will return to neutral position automatically when the pilot removes all force from his controls. Not only should the effort of the pilot to move his controls encounter resistance to a reasonable degree, but such resistance should increase progressively with increase in speed of the aircraft, and should increase preferably substantially linearly in accordance with the deflection of the control surface.

It is an object of the present invention to provide mechanism producing resistance to movement of a pilot's control, which resistance will increase with deflection of a control surface and speed of the aircraft, especially to prevent an actual decrease in resistance or elimination of resistance to movement of the control surface at high angles of attack of the control surface and at sonic or higher velocities. Such mechanism incorporates a resistance pressure member operatively connected to the pilot's control, and the pressure on which increases as the control surface deflection increases. More specifically, such a resistance pressure member is a plate which is not directly exposed to the air stream and preferably is connected to move with the control surface and the pilot's control.

A further object is to provide such a resistance pressure member installation which is light and compact and can be incorporated in a control system without interfering with the structure or mounting of the control surface or the airfoil structure from which it is supported. Moreover, the size and arrangement of such a resistance pressure member installation can be selected readily to produce the desired amount of resistance for a predetermined degree of control surface deflection.

For accomplishing these objects the resistance pressure member preferably is a plate pivotally mounted within the internal nose balance of a swingable aircraft control surface, which is connected by linkage to move conjointly with the pilot's control and the boost or power mechanism utilized to move or assist movement of the control surface, such as a control tab. Opposite sides of such resistance pressure plate are exposed to a differential pressure as the control surface is deflected from neutral position, and the difference in pressures on opposite sides of such resistance pressure plate increases with deflection of the control surface from neutral position and approximately proportional to such deflection.

A preferred arrangement of the resistance pressure plate in a representative aircraft control surface installation is shown in the accompanying drawings.

Figure 1 is a chordwise sectional view through a control surface, a portion of a stationary airfoil on which such control surface is mounted, and a control tab carried by the control surface, such control surface being shown in neutral or undeflected position.

Figure 2 is a similar view showing the control surface deflected relative to the stationary airfoil in one direction, and Figure 3 is a similar view showing the control surface deflected in the other direction relative to the supporting airfoil.

Figure 4 is a fragmentary face view of a control surface, its supporting surface, and a control tab carried by the control surface, parts being broken away to reveal internal structure.

While, as has been mentioned above, the resistance producing mechanism of the present invention can be used with systems incorporating various types of servo or power controls for control surfaces, it is illustrated as being incorporated in a system utilizing a control tab for exerting a force to swing a control surface. Also, such an installation is particularly well adapted for use in conjunction with an aileron installation which is illustrated in the drawings, although similar mechanism could be employed in an elevator installation or a rudder installation. In each of these cases the swingable control surface will be pivotally mounted near its forward end on a normally stationary airfoil, which would be the wing in the case of an aileron, the horizontal stabilizer in the case of an elevator and the vertical fin in the case of a rudder. In each instance the control tab would be carried swingably on the trailing edge of the swingable control surface.

In the particular installation illustrated the control surface 1 is of the balanced type carried by the pivot or hinge 2, which is mounted on the trailing edge of the wing 3. A leading portion 4 of the aileron 1 ahead of the pivot 2 projects into the wing cavity between the inner surfaces of the upper and lower wing skins 5 and 6, the forward portion of which cavity is closed by the bulkhead 7. The gap between the leading edge of the control surface and the adjacent airfoil structure, including bulkhead 7, may always be closed by the sealing membrane 8, or may be restricted increasingly with deflection of the control surface by substituting for the sealing membrane a suitable flap which approaches progressively closer to the adjacent airfoil structure as the control surface is swung farther from its centered position in either direction. The control tab 9 is swingably mounted on the hinge rod 10 which is carried by the trailing edge of the control surface 1.

The pilot's control is connected to the rod 11 extending chordwise through the wing 3, and this rod may be connected to exert a control force both on the control tab 9 and on the control surface 1. In that case it does not pass through the axis of the control surface hinge 2, but is connected to the swinging end of link 12 mounted by pivot 12' on one side of the control surface offset preferably directly transversely from the control surface hinge. A further link 13 connects the pivot joint 14 of links 11 and 12 with the horn 15 projecting laterally from the side of tab 9 opposite the side of the control surface on which link 12 is pivoted.

The leading portion 4 of the control surface is hollow, and the resistance pressure plate 16 is received within the hollow defined by the opposite sides of such control surface leading portion and the bulkhead 17 extending spanwise through the hinge line of the control surface. Such resistance pressure plate is pivotally mounted by hinge 18, carried by brackets 19 spaced spanwise along the nose of the control surface, as shown best in Figure 4. This resistance pressure plate has a horn 20 carried by its hinge 18 and projecting laterally from it, the swinging end of which is connected to the pivot 14 of the control linkage by the link 21.

In order to produce a difference in pressure on opposite sides of the resistance pressure plate 16, the opposite sides of such plate are exposed to the pressures at opposite sides of the control surface leading portion 4. It is well known that a balancing effect assisting swinging of the control surface is obtained by establishing communication between the portions of the control surface leading portion receiving cavity in the wing at opposite sides of such leading portion and the atmosphere adjacent to opposite sides of the wing and aileron combination at approximately the hinge line of the aileron. Thus when the aileron is swung upward as shown in Figure 2, the aileron deflection will produce a high pressure region on the upper side of the wing and aileron combination and a low pressure region on the lower side of such combination. The upper part of the wing chamber in which the aileron leading portion 4 is received communicates with the high pressure region through the slot 22, and the low pressure region at the opposite side of the wing and aileron combination is in communication with the lower portion of the wing chamber receiving the aileron leading portion through the slot 23. Consequently, when the aileron is in the deflected position shown in Figure 2, the pressure in the upper portion of the wing cavity receiving the aileron leading portion will be higher than the pressure in the lower portion of this cavity, and consequently, the differential pressure on the aileron leading portion 4 and the membrane 8 will assist upward swinging of the aileron.

If the aileron is swung downward from the neutral position of Figure 1 relative to the wing into the position shown in Figure 3, the communication of the lower portion of the wing chamber receiving the aileron leading portion 4 through slot 23 with the atmosphere at the lower side of the wing and aileron combination will produce a relatively high pressure in this portion of the wing cavity. With the parts in this position, the pressure of the atmosphere at the upper side of the wing and aileron combination will be relatively low, and the pressure within the upper portion of the wing cavity receiving the aileron leading portion, as communicated through slot 22, will be correspondingly low. The difference between the pressures at opposite sides of the leading portion 4 will therefore exert a moment on the aileron assisting its downward swinging.

When the control surface is to be swung upward, such as from the position shown in Figure 1 to that of Figure 2, forward movement of the control rod 11, as indicated by the arrow in Figure 2, will move link 13 forward to produce a counterclockwise moment on the control tab horn 15. Such moment will swing the tab downward relative to the aileron 1, because the differential pressure produced on the leading portion 4 of the aileron will not be sufficient in itself to swing the aileron. Such movement of the linkage not only will swing the control tab 9 downward, but the link 12 also will produce on the pivot 12' a component perpendicular to a line joining such pivot and the aileron hinge 2, which will exert a clockwise moment directly on the aileron. The angle of deflection of the aileron produced by movement of control rod 11 will therefore depend upon the torque produced directly on the aileron by the link 12, the torque produced on the trailing portion of the aileron by the aerodynamic reaction on the deflected control tab 9, and the static pressure torque on the aileron leading portion 4 produced by the differential pressure on its opposite sides.

It will be evident that the torque of the differential pressure on the leading portion 4 of the aileron produces no resistance to movement of the control rod 11. The effectiveness of the tension in link 12 to swing the aileron is a component substantially parallel to the rod 11, and consequently the resistance to movement of rod 11 increases as the force applied directly to the aileron increases. This force, however, is a relatively small part of the tension force in rod 11 for most of this force is transmitted on through link 13 to the control tab 9. As swinging of the control tab from its neutral position of Figure 1 is initiated toward the position of Figure 2, the air flow beneath the aileron will oppose such deflection of the control tab to produce a resistance to movement of link 13 and consequently of rod 10.

Particularly at low speeds, even the initial resistance to movement of link 13 and rod 11 produced by deflection of tab 9 is not great, and the effectiveness of the control tab deflection to swing the aileron increases with deflection much more rapidly than the resistance which the control tab produces in the link 13. In fact, as the aileron approaches its position of maximum deflection in the direction illustrated in Figure 2, especially at speeds approaching sonic velocity, or higher, the pressure on the under side of the aileron's trailing edge is so reduced as compared to that on its upper side by reason of such deflection that the pressure on the under side of the control tab, despite its deflection relative to the aileron, may actually be less than the pressure on its upper side. Such pressure relationship will tend to increase the deflection of the control tab relative to the aileron, and thus further increase the deflection of the aileron, and undesirably decrease the resistance to movement of the control rod.

Actually, increased resistance on the tab and control rod with further deflection of the aileron is important, so that if the pilot should free his control the tab and the control surface would automatically return to their control positions, and the amount of control surface displacement possible at high speeds would be limited. To insure such an increased force a differential pressure is produced on the resistance pressure plate 16 so that it will exert a force in link 21 increasingly opposing movement of pivot 14 from the neutral position shown in Figure 1 with increase in deflection of the aileron 1 relative to the wing 3. In order to establish a differential pressure on opposite sides of the resistance pressure plate, the chamber in which it is received is divided into two compartments by the membrane 24 extending between the swinging edge of the plate 16 and the central portion of the bulkhead 17. The compartment at the upper side of the aileron communicates with the compartment of the wing's aileron leading portion receiving chamber at the corresponding side of the aileron through a slot 25. The lower compartment within the aileron balance communicates with the lower compartment of the wing's leading portion receiving chamber through the slot 26.

When the aileron is deflected upward by a pulling force applied to control rod 11, as shown in Figure 2, the pressure on the upper side of the aileron leading portion 4 will be greater than the pressure on its lower side, as previously described.

Correspondingly, by virtue of the communication through slots 25 and 26 the pressure on the upper side of plate 16 will be greater than the pressure on its lower side. Such pressure will tend to swing the plate in a counterclockwise direction exerting a compression force in link 21, which opposes the pull in control rod 11 that is tending to move the control tab in a direction to increase the deflection of the aileron. The relative pressures exerted on opposite sides of the plate 16 are respectively equal to the pressures at opposite sides of the aileron leading portion 4, effected by the pressures at opposite sides of the wing and aileron junction. Consequently the difference in such pressures increases progressively with aileron deflection, instead of reversing at its high angles of deflection like the pressures on the control tab. Also, while the linkage shown effects upward swinging of the resistance pressure plate to the position illustrated in Figure 2, such positional change does not alter the pressure differential on its opposite sides since the pressures in the two compartments to which such plate sides are exposed are entirely independent of the positional relationship between the resistance pressure plate and the walls of the aileron balance chamber.

When a compression force is produced in the control rod 11, pivot 14 will be moved rearwardly to produce a compression force in link 13 effecting a clockwise moment on control tab 9. Such movement also produces a tension in link 21 setting up a counterclockwise moment on resistance pressure plate 16 to swing it about its hinge 18 toward the position shown in Figure 3. The upward deflection of the control tab produces aerodynamic forces which depress the aileron 1 toward the position of Figure 3, resulting in the pressure below the wing and aileron combination being greater than that above such combination at the vicinity of their junction. The high pressure communicated through slot 23 will exert an upward force on the balance 4 tending to assist swinging of the aileron, and this same pressure transmitted through slot 26 will produce a tension in link 21 tending to move pivot 14 toward the right. This force, therefore, opposes the force exerted by the pilot on control rod 11 so that he feels a resistance to the control movement which he initiated.

Figure 4 shows the length of the resistance pressure plate 16 spanwise of the aileron to be much shorter than the length of the aileron or even than the length of the control tab. It will be evident that the longer such resistance pressure plate is made spanwise of the aileron, and the wider it is made chordwise of the aileron, the greater will be the force which it produces resisting movement of the control rod 11 by the pilot. The proportions of the resistance pressure plate and the length of the lever arm of horn 20 may therefore be selected to produce the desired degree of resistance to movement of the pilot's control. Since the resistance pressure plate installation is contained wholly within the leading portion 4 of the aileron, the presence or absence of such a pressure plate installation and its size and arrangement does not affect the construction, design or arrangement of the wing, aileron and control tab combination. Consequently, the resistance pressure plate installation can be added to existing airplanes to increase the resistance to control movement without altering the general design of the control system. Also, since the resistance pressure plate installation is contained entirely within the aileron and has no additional external ports, the aerodynamic characteristics of the control installation will not be altered in any way by its addition or deletion. The same considerations apply to such a resistance pressure plate installation in an aircraft elevator or rudder, as well as in an aileron.

While the resistance pressure plate is shown as mounted in a leading portion of the control surface, it will be evident that such resistance pressure plate could be installed in any portion of the control surface interior and need not even be arranged symmetrically. In fact, if it does not interfere with structure, it could be disposed in an upright plane either spanwise or chordwise of the wing instead of in a generally horizontal plane and extending spanwise of the control surface. Use of such a resistance pressure plate is therefore not restricted to a balanced type of control surface. Moreover, the present invention would be useful in connection with an unbalanced type of control surface moved by power mechanism.

We claim as our invention:

1. In an aircraft control system having a pilot-movable member operatively connected to move a control surface, mechanism for resisting forces producing movement of such control surface, comprising an enclosed resistance pressure member, means communicating with the atmosphere on at least one side of the aircraft control surface at a location where the pressure of the atmosphere is varied by movement of the aircraft control surface and operable to apply such varying pressure to said resistance pressure member, and means independent of the control surface operatively connecting said resistance pressure member to the pilot-movable member to transmit the force of such varying pressure on said resistance pressure member to the pilot-movable member in opposition to forces exerted thereby tending to effect movement of the aircraft control surface.

2. In an aircraft control system having a pilot-movable member operatively connected to move a control surface, mechanism for resisting forces producing movement of such control surface, comprising an enclosed resistance pressure member, means communicating with the atmosphere at locations at opposite sides of the aircraft control surface where the pressure of the atmosphere is varied by movement of the aircraft control surface and operable to apply varying differential pressure of such locations to said resistance pressure member, and means independent of the control surface operatively connecting said resistance pressure member to the pilot-movable member to transmit the force of such varying pressure on said resistance pressure member to the pilot-movable member in opposition to forces exerted thereby tending to effect movement of the aircraft control surface.

3. In an aircraft control system having a swingable control tab pivotally mounted on the trailing portion of a control surface and a pilot-movable control rod extending generally chordwise through the control surface and operatively connected to the control tab to effect swinging thereof by movement of the control rod, mechanism for resisting forces producing movement of such control surface, comprising a resistance pressure member enclosed within the control surface, means communicating with the atmosphere and operable to exert pressure on said resistance pressure member, and means independent of the control surface operatively connecting said resistance pressure member to the control rod to transmit the force of such pressure on said resistance pressure member to the control rod in opposition to forces exerted thereby tending to effect swinging of the control tab.

4. In an aircraft control system having a pilot-movable member operatively connected to move a control surface, mechanism for resisting forces producing movement of such control surface, comprising a resistance pressure plate received within the control surface, means establishing communication between one side of said resistance pressure plate and the atmosphere at a location at the corresponding side of the control surface where the pressure of the atmosphere is varied by movement of the aircraft control surface, and further means establishing communication between the other side of said resistance pressure plate and the atmosphere at a location at the other side of the control surface where the pressure of the atmosphere is varied by movement of the aircraft control surface, to exert the differential of such pressures on said resistance pressure plate, and means independent of the control surface operatively interconnecting for conjoint movement said resistance pressure plate and the pilot-movable member to transmit the force of such differential pressure on said resistance pressure plate to the pilot-movable member in opposition to forces exerted thereby tending to effect movement of the aircraft control surface.

5. In an aircraft control system having a pilot-movable member operatively connected to move a control surface, mechanism for resisting forces producing movement of such control surface, comprising a resistance pressure plate enclosed in the control surface, means defining air pressure compartments at opposite sides of said resistance pressure plate, means communicating to one of said compartments the pressure at a location at one side of the control surface where the pressure of the atmosphere is varied by movement of the aircraft control surface, and to the other of said compartments pressure at a location at the other side of the control surface where the pressure of the atmosphere is varied by movement of the aircraft control surface to exert the differential of such pressures on said resistance pressure plate, and means independent of the control surface interconnecting for conjoint movement said resistance pressure plate and the pilot-movable member to transmit the force of such differential pressure on said resistance pressure plate to the pilot-movable member in opposition to forces exerted thereby tending to effect movement of the aircraft control surface.

6. In an aircraft control system having a pilot-movable member operatively connected to move a control surface, mechanism for resisting forces producing movement of such control surface, comprising a resistance pressure plate pivotally mounted adjacent to one edge in the control surface, means defining air pressure compartments at opposite sides of said resistance pressure plate, means communicating to one of said compartments the pressure at a location at one side of the control surface where the pressure of the atmosphere is varied by movement of the aircraft control surface, and to the other of said compartments pressure at a location at the other side of the control surface where the pressure of the atmosphere is varied by movement of the aircraft control surface, to exert the differential of such pressures on said resistance pressure plate, and means independent of the control surface interconnecting for conjoint movement said resistance pressure plate and the pilot-movable member to transmit the force of such differential pressure on said resistance pressure plate to the pilot-movable member in opposition to forces exerted thereby tending to effect movement of the aircraft control surface.

7. In an aircraft control system having a control tab swingably mounted on the trailing edge of a control surface and a pilot-movable control rod extending through such control surface and operatively connected to the control tab to effect swinging thereof by movement of the control rod, mechanism for resisting forces producing movement of such control surface, comprising a resistance pressure plate received within the control surface, pivot means adjacent to one edge of said resistance pressure plate and mounting the same for swinging, means cooperating with said resistance pressure plate to define air pressure chambers at opposite sides thereof, means establishing communication between the atmosphere at a location at one side of the control surface where pressure of the atmosphere is varied by movement of the aircraft control surface and one of said air pressure compartments, means establishing communication between the atmosphere at a location at the other side of the control surface where the pressure of the atmosphere is varied by movement of the aircraft control surface and the other air pressure compartment, to exert the differential of such pressures on said resistance pressure plate, and linkage means interconnecting said resistance pressure plate and the pilot-movable rod and operable to effect conjoint movement of the rod and swinging of said resistance pressure plate and to transmit the force of such differential pressure on said resistance pressure plate to the pilot-movable rod in opposition to forces exerted thereby tending to effect swinging of the control tab.

8. In an aircraft control system having a pilot-movable control member operatively connected to effect swinging of a balanced aircraft control surface having a leading portion ahead of its hinge axis, mechanism for resisting forces producing movement of such control surface, comprising a resistance pressure plate received within such leading portion of the control surface, pivot means adjacent to one edge of said resistance pressure plate and supporting the same for swinging, a partition extending spanwise and transversely of the control surface between opposite sides thereof, a sealing membrane connected between said partition and the adjacent swinging edge of said resistance pressure plate and defining air pressure compartments at opposite sides of said resistance pressure plate, vent means establishing communication between one of such air pressure compartments and the atmosphere at a location at one side of the control surface where the pressure of the atmosphere is varied by movement of the aircraft control surface, vent means establishing communication between the other of such air pressure compartments and the atmosphere at a location at the other side of the control surface where the pressure of the atmosphere is varied by movement of the aircraft control surface, to exert the differential of such pressures on said resistance pressure plate, and a link interconnecting said resistance pressure plate and the control member for effecting conjoint movement thereof and for transmitting the force of such differential pressure on said resistance pressure plate to the pilot-movable control member in opposition to forces exerted tending to effect swinging of the aircraft control surface.

9. In an aircraft control system having a control tab pivotally mounted on the trailing portion of a balanced aircraft control surface having a leading portion ahead of its hinge axis and a pilot-movable control rod extending generally chordwise through the control surface and operatively connected to the control tab to effect swinging thereof by lengthwise movement of the control rod, mechanism for resisting forces producing movement of such control surface, comprising a resistance pressure plate received within such leading portion of the control surface, pivot means adjacent to one edge of said resistance pressure plate and supporting the same for swinging, a partition extending spanwise and transversely of the control surface between opposite sides thereof, a sealing membrane connected between said partition and the adjacent swinging edge of said resistance pressure plate and defining air pressure compartments at opposite sides of said resistance pressure plate, vent means establishing communication between one of such air pressure compartments and the atmosphere at one side of the control surface at a location adjacent to its hinge axis, vent means establishing communication between the other of such air pressure compartments and the atmosphere at the other side of the control surface at a location adjacent to its hinge axis, to exert the differential of such pressures on said resistance pressure plate, and a link interconnecting said resistance pressure plate and the control rod for effecting conjoint movement thereof and for transmitting the force of such differential pressure on said resistance pressure plate to the pilot-movable control rod in opposition to forces exerted thereby tending to effect swinging of the control tab.

10. In an aircraft control system having a control tab pivotally mounted on the trailing portion of a balanced aircraft control surface having a leading portion ahead of its hinge axis and a pilot-movable control rod extending generally chordwise through the control surface and operatively connected to the control tab to effect swinging thereof by lengthwise movement of the control rod, mechanism for resisting forces producing movement of such control surface, comprising a generally horizontal resistance pressure plate received within such leading portion of the control surface, pivot means adjacent to the forward edge of said resistance pressure plate and supporting the same for swinging of its rearward edge, a partition extending spanwise and transversely of the control surface between opposite sides thereof adjacent to the hinge axis of the control surface, a sealing membrane connected between said partition and the adjacent swinging edge of said resistance pressure plate and defining air pressure compartments at opposite sides of said resistance pressure plate, vent means establishing communication between one of such air pressure compartments and the atmosphere at one side of the control surface at a location adjacent to its hinge axis, vent means establishing communication between the other of such air pressure compartments and the atmosphere at the other side of the control surface at a location adjacent to its hinge axis, to exert the differential of such pressures on said resistance pressure plate, and a link interconnecting said resistance pressure plate and the control rod for effecting conjoint movement thereof and for transmitting the force of such differential pressure on said resistance pressure plate to the pilot-movable control rod in opposition to forces exerted thereby tending to effect swinging of the control tab.

References Cited in the file of this patent

UNITED STATES PATENTS

| | | |
|---|---|---|
| 2,370,844 | Davis | Mar. 6, 1945 |
| 2,435,922 | Davis | Feb. 10, 1948 |
| 2,445,343 | Tyra | July 20, 1948 |
| 2,458,896 | Darby | Jan. 11, 1949 |
| 2,575,532 | Sears | Mar. 20, 1951 |
| 2,661,169 | Ashkenas | Dec. 1, 1953 |
| 2,678,179 | Feeney et al. | May 11, 1954 |

UNITED STATES PATENT OFFICE
CERTIFICATE OF CORRECTION

Patent No. 2,853,256 September 23, 1958

Louis V. Schmidt et al.

It is hereby certified that error appears in the printed specification of the above numbered patent requiring correction and that the said Letters Patent should read as corrected below.

Column 8, line 41, after "exerted" insert -- thereby --.

Signed and sealed this 30th day of December 1958.

(SEAL)
Attest:

KARL H. AXLINE
Attesting Officer

ROBERT C. WATSON
Commissioner of Patents